US010578030B2

(12) United States Patent
Javelot et al.

(10) Patent No.: US 10,578,030 B2
(45) Date of Patent: Mar. 3, 2020

(54) METHOD AND DEVICE FOR ADJUSTING A THRESHOLD VALUE OF A FUEL FLOW RATE (71) Applicant: SAFRAN AIRCRAFT ENGINES, Paris (FR)

(72) Inventors: Christophe Javelot, Rungis (FR); Cedrik Djelassi, Marolles en Hurepoix (FR); Bruno Robert Gaully, Marolles en Hurepoix (FR); Ismail Sylla, Toulouse (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 262 days.

(21) Appl. No.: 14/409,822

(22) PCT Filed: Jun. 20, 2013

(86) PCT No.: PCT/FR2013/051435
§ 371 (c)(1),
(2) Date: Dec. 19, 2014

(87) PCT Pub. No.: WO2013/190237
PCT Pub. Date: Dec. 27, 2013

(65) Prior Publication Data
US 2015/0152790 A1 Jun. 4, 2015

(30) Foreign Application Priority Data

Jun. 21, 2012 (FR) ...................................... 12 55852

(51) Int. Cl.
F02C 9/00 (2006.01)
F02C 9/26 (2006.01)
F02C 9/32 (2006.01)

(52) U.S. Cl.
CPC ................ *F02C 9/26* (2013.01); *F02C 9/263* (2013.01); *F02C 9/32* (2013.01);
(Continued)

(58) Field of Classification Search
CPC .... F02C 9/28; F02C 9/26; F02C 9/263; F02C 9/32; F02C 9/44; F05B 2270/105; F05D 2270/07
See application file for complete search history.

(56) References Cited

U.S. PATENT DOCUMENTS

2004/0117102 A1   6/2004  Weir et al.
2005/0043905 A1*  2/2005  Vary .......................... F02C 9/26
                                                        702/45
(Continued)

FOREIGN PATENT DOCUMENTS

EP   1 067 282 A2   1/2001
EP   1 510 795 A2   3/2005
(Continued)

OTHER PUBLICATIONS

International Search Report dated Sep. 26, 2013, in PCT/FR13/051435 filed Jun. 20, 2013.

*Primary Examiner* — Todd E Manahan
*Assistant Examiner* — Katheryn A Malatek
(74) *Attorney, Agent, or Firm* — Oblon, McClelland, Maier & Neustadt, L.L.P.

(57) ABSTRACT

A method of adjusting a fuel flow rate in a turbine engine propelling an aircraft, including: obtaining a first estimate of a flow rate of fuel injected into a combustion chamber of the turbine engine propelling an aircraft and as delivered by a fuel metering device of the turbine engine; obtaining a second estimate of the fuel flow rate, which second estimate is more accurate than the first estimate for at least one range of fuel flow rate values and being delivered by an estimator (Continued)

device having a flow meter; and adjusting the fuel flow rate threshold value with help of a difference evaluated between the first estimate and the second estimate, the threshold value being for use in an open loop for regulating the turbine engine.

11 Claims, 6 Drawing Sheets

(52) U.S. Cl.
CPC .. *F05D 2220/323* (2013.01); *F05D 2270/044* (2013.01); *F05D 2270/114* (2013.01); *F05D 2270/306* (2013.01); *F05D 2270/309* (2013.01)

(56) References Cited

U.S. PATENT DOCUMENTS

| | | | |
|---|---|---|---|
| 2010/0280731 A1* | 11/2010 | Snider | F02C 9/26 701/100 |
| 2013/0091851 A1 | 4/2013 | Gaully et al. | |
| 2013/0213053 A1 | 8/2013 | Gaully et al. | |

FOREIGN PATENT DOCUMENTS

| | | |
|---|---|---|
| FR | 2 966 518 A1 | 4/2012 |
| WO | WO 2011/128573 A1 | 10/2011 |

* cited by examiner

METHOD AND DEVICE FOR ADJUSTING A THRESHOLD VALUE OF A FUEL FLOW RATE

BACKGROUND OF THE INVENTION

The present invention relates to the general field of turbine engines and it applies in preferred manner to the field of aviation.

The invention relates more particularly to regulating the flow rate of fuel to an aircraft turbine engine, such as a turbojet for example, during a transient stage of operation for the aircraft, such as a stage of acceleration or of deceleration.

In known manner, the fuel flow rate for a turbojet is regulated for the purpose of ensuring that the mass flow rate of fuel injected into the combustion chamber of the turbojet during a stage of acceleration or of deceleration does not cross a certain limit value beyond which it is possible that the turbojet will malfunction. By way of example, such malfunctioning may be surging of a compressor of the turbojet during a stage of acceleration or burning out of the turbojet during a stage of deceleration.

Nowadays, this regulation relies on an estimate of the mass flow rate of fuel injected into the combustion chamber as established from the position of the fuel metering device of the turbojet.

More precisely, the fuel metering device has a slide of position, also called fuel metering valve (FMV), whose position is proportional to the volume flow rate of fuel that is to be injected into the combustion chamber, providing the pressure difference across the slide is kept constant.

On moving, the slide obstructs a fuel flow section S in the fuel metering device to a greater or lesser extent. The section S, also referred to as the flow area of the fuel metering device, can easily be determined as a function of the position of the slide. It is proportional to the volume flow rate of fuel injected into the combustion chamber.

The section S is controlled via a servo-control loop by means of an electronic engine control unit (ECU) forming part of the full authority digital engine control (FADEC) of the aircraft. The ECU establishes the mass flow rate demand for fuel in the form of a setpoint signal that is transmitted to the fuel metering device via the servo-control loop, this mass flow rate demand for fuel then being transformed into a volume flow rate.

The mass flow rate of fuel injected into the combustion chamber can thus be estimated on the basis of measuring the position of the fuel metering device and of an associated relationship that is known to the person skilled in the art. This relationship depends on the density (i.e. the mass per unit volume) of the fuel used by the aircraft.

The density of the fuel is generally assumed to be constant during a mission of the aircraft. It is predetermined as a function of reference conditions, i.e. for a reference fuel and at a reference temperature.

Nevertheless, this assumption does not take account of a possible change in the nature of the fuel used relative to the reference fuel, nor does it take account of possible variation in the temperature of the fuel relative to the reference temperature while the turbojet is in operation.

Nor does it take account of the fact that, for a given fuel, there may exist dispersion in density value around the reference value used in the relationship.

Furthermore, this assumption suffers from various uncertainties associated in particular with the interchangeability of the pieces of electronic equipment used for processing position measurements of the metering device and also associated with the accuracy of those pieces of equipment.

Consequently, using such a relationship leads to inaccuracies in the estimated mass flow rate of fuel injected into the combustion chamber as used while regulating the turbojet.

Unfortunately, if the mass flow rate of fuel being injected into the combustion chamber is underestimated by the fuel metering device, that means that the acceleration margin available to the turbojet during a transient stage of acceleration will on the contrary be overestimated (i.e. the turbojet will be presumed to have an acceleration margin greater than that which would be presumed if the fuel mass flow rate were estimated correctly). There is thus a risk of undesired acceleration of the turbojet, and potentially of the compressor surging during acceleration.

In an opposite manner, the deceleration margin of the turbojet during a deceleration stage will be underestimated (i.e. the turbojet will be presumed to have a deceleration margin that is smaller than that which would be presumed if the fuel mass flow rate were estimated correctly). There is thus a risk of not being able to decelerate correctly.

Conversely, if the mass flow rate of fuel being injected into the combustion chamber is overestimated by the fuel metering device, that means that the deceleration margin available to the turbojet during a transient stage of deceleration will be overestimated (i.e. the turbojet will be presumed to have a deceleration margin that is greater than that which would be presumed if the fuel mass flow rate were estimated correctly). There thus exists a risk of the turbojet suffering underspeed or burnout.

In an opposite manner, the acceleration margin of the turbojet in an acceleration stage will be underestimated (i.e. the turbojet will be presumed to have an acceleration margin that is smaller than that which would be presumed if the fuel mass flow rate were estimated correctly). There thus exists the risk of not being able to accelerate correctly.

The lack of accuracy in the estimate provided by the metering device thus has a non-negligible impact on the regulation of the turbojet and on the performance it achieves.

There therefore exists a need to regulate the turbojet in a manner that does not present such drawbacks.

OBJECT AND SUMMARY OF THE INVENTION

The present invention satisfies this need in particular by proposing a method of adjusting a fuel flow rate threshold value, for use in an open loop for regulating a turbine engine propelling an aircraft, the method comprising:

an obtaining step of obtaining a first estimate of a flow rate of fuel injected into a combustion chamber of the turbine engine and as delivered by a fuel metering device of the turbine engine;

an obtaining step of obtaining a second estimate of flow rate of fuel injected into the combustion chamber, the second estimate being more accurate than the first estimate over at least one range of fuel flow rate values and being delivered by an estimator device having a flow meter; and an adjustment step of adjusting the fuel flow rate threshold value, with the help of a difference evaluated between the first estimate and the second estimate.

Correspondingly, the invention also provides a device for adjusting a fuel flow rate threshold value, for use in an open loop for regulating a turbine engine propelling an aircraft, the device comprising:

obtaining means for obtaining a first estimate of a flow rate of fuel injected into a combustion chamber of the turbine engine and as delivered by a fuel metering device of the turbine engine;

obtaining means for obtaining a second estimate of flow rate of fuel injected into the combustion chamber, the second estimate being more accurate than the first estimate over at least one range of fuel flow rate values and being delivered by an estimator device having a flow meter; and adjusting means for adjusting the fuel flow rate threshold value with the help of a difference evaluated between the first estimate and the second estimate.

In the meaning of the invention, a fuel flow rate threshold value defines a maximum or a minimum fuel flow rate for injecting at a given instant into the combustion chamber of the turbine engine.

This threshold value is particularly important when regulating the engine, in particular during a stage of acceleration or of deceleration, since it is compared in an open loop with the estimate of the actual rate at which fuel is being injected into the combustion chamber of the turbine engine in order to regulate fuel delivery and in order to estimate the acceleration or deceleration margin that is available for the turbine engine. This threshold value is also known as an acceleration or deceleration stop.

These acceleration and deceleration stops thus put limits on the performance of the turbine engine. Conventionally they are set by the sector in charge of the operability of the turbine engine so as to avoid the turbine engine malfunctioning such as surging in acceleration (which gives rise to a decrease in acceleration power), or the turbine engine burning out in deceleration. The acceleration and deceleration stops are determined in particular, in known manner, with reference to the surge line of the compressor of the turbine engine, while taking account of wear of parts of the turbine engine, of inaccuracies in the measurement equipment, of dispersions relative to reference values that might be encountered among various turbine engines, etc.

The invention advantageously proposes adjusting these threshold values or stops while taking account of the accuracy (or more precisely of the lack of accuracy) in the estimate of the fuel flow rate as delivered by the metering device at certain flow rates. Preferably, it is ensured that the threshold value is adjusted using the difference evaluated between the first estimate and the second estimate only when the rate at which fuel is being injected into the combustion chamber has a value lying within a range of values for which the second estimate is more accurate than the first estimate.

In the meaning of the invention, the term "estimate" concerning a fuel flow rate as delivered by the fuel metering device of the turbine engine means either an estimate delivered directly by the fuel metering device, or else by extension an estimate that is deduced from the state of the metering device, i.e. a device including a fuel metering valve (FMV) as described above, the estimate being deduced from the position of the slider of the valve in application of an appropriate relationship known to the person skilled in the art.

More precisely, the invention proposes incorporating in the threshold value used for regulating the turbine engine (i.e. in the acceleration and/or deceleration stop) the difference between the fuel flow rate estimate as delivered by the metering device and a more accurate estimate delivered by an estimator device that uses a flow meter. By way of example, such an estimator device is described in Document FR 2 958 976 or in Document EP 1 510 795. In known manner, it is more accurate than the metering device, over at least one range of values of flow rate at which fuel is injected into the combustion chamber of the turbine engine.

Incorporating this difference in the acceleration and/or deceleration stops serves to avoid overconstraining, or on the contrary underconstraining the turbine engine during a stage of acceleration or of deceleration. This leads to an improvement in the available acceleration and deceleration margins. Depending on the way in which the adjustment is performed, this leads:

to a saving in time needed for accelerating and decelerating; the performance of the turbine engine is thus improved; and/or to protection against the turbine engine surging or suffering underspeed or burnout.

Furthermore, the estimate delivered by the estimator device, although it is more accurate than the fuel flow rate estimate delivered by the metering device over at least one range of fuel flow rate values, is itself also often vulnerable to failures. The fact of using this estimate only in an open loop as proposed in the invention, rather than using it continuously as a replacement for the estimate delivered by the metering device, makes it possible to limit the impact of such a failure on the operation of the turbine engine. In particular, the invention does not introduce an additional risk of failure in the other regulation loops of the turbine engine.

In a particular implementation, the adjustment step comprises adding to the fuel flow rate threshold value, the difference evaluated between the first estimate and the second estimate, as weighted by a predetermined weighting factor, which weighting factor has a positive value that is selected to be less than or equal to 1.

The weighting factor advantageously serves to control the correction that is applied to the fuel flow rate threshold value, e.g. as a function of the reliability of the estimates used. By way of example, it may be determined by testing in order to optimize the performance of the turbine engine.

In a particular implementation of the invention, the adjustment method comprises a comparison step of comparing the difference evaluated between the first estimate and the second estimate as weighted by the predetermined weighting factor relative to an expected accuracy difference between the first estimate and the second estimate.

The term "expected accuracy difference" between the first estimate and the second estimate is used herein to mean the difference between the accuracies of the metering device and of the estimator device, as conventionally supplied by the manufacturers of those devices.

The adjustment of the threshold value may depend on the result of this comparison step. Thus, by way of example, it is possible to adopt the following adjustment mechanism:

the threshold value is adjusted with the help of the difference evaluated between the first estimate and the second estimate if the difference evaluated between the first and second estimates as weighted by the predetermined weighting factor is less than the expected accuracy difference between the first and second estimates; and otherwise the threshold value is adjusted with the help of the expected accuracy difference between the first estimate and the second estimate.

This ensures that the threshold value is not adjusted erroneously, in particular when the estimator device having the flow meter presents a failure or delivers an estimate that is less reliable than the estimate delivered by the fuel metering device.

In another implementation of the invention, the adjustment method comprises a comparison step of comparing the difference evaluated between the first estimate and the second estimate with a threshold defined on the basis of an expected accuracy for the first estimate.

Such a comparison step makes it possible in particular to ensure that the relative difference between the first estimate and the second estimate is less than the maximum inaccuracy of the metering device, and to adjust the threshold value only when appropriate. This avoids the threshold value being adjusted with an outlier value, which would not lead to an improvement in the accuracy of the estimate delivered by the metering device.

In other words, the above-mentioned comparison step serves to ensure that the adjustment of the threshold value using the difference between the first estimate and the second estimate is performed only in a range of fuel flow rate values for which the second estimate as delivered by the estimator device is reliably more accurate than the first estimate as delivered by the metering device.

As mentioned above, the invention advantageously makes it possible to adjust, in other words to correct, the fuel flow rate threshold value for use during a stage in which the aircraft is accelerating (i.e. an acceleration stop) and/or a fuel flow rate threshold value for use during a stage in which the aircraft is decelerating (i.e. a deceleration stop), while taking account of the accuracy of the estimate of the fuel flow rate as delivered by the metering device.

Various adjustment strategies may be used depending on the objective that it is desired to achieve in the regulation of the turbine engine.

Thus, in one implementation, when the fuel flow rate threshold value under consideration is for use during a stage in which the aircraft is accelerating, this threshold value is adjusted during the adjustment step with the help of the difference as evaluated between the first estimate and the second estimate providing this difference is positive, with the threshold value otherwise remaining unchanged.

Similarly, when the fuel flow rate threshold value under consideration is for use during a stage in which the aircraft is decelerating, this threshold value is adjusted during the adjustment step with the help of the difference as evaluated between the first estimate and the second estimate providing this difference is negative, with the threshold value otherwise remaining unchanged.

Thus, in this implementation, at each adjustment step, only one or the other of the acceleration and deceleration stops is adjusted, depending on the sign of the difference between the first and second estimates. This implementation option serves to improve the performance of the turbine engine in terms of acceleration or deceleration margin so as to avoid overconstraining the delivery of fuel during stages of acceleration or of deceleration.

Furthermore, and in advantageous manner, in this implementation, the accuracy margins set by the sector in charge of the operability of the turbine engine are conserved for estimating the fuel flow rate used in regulating the turbine engine.

In another implementation:
  when the fuel flow rate threshold value under consideration is for use during a stage in which the aircraft is accelerating, this threshold value is adjusted during the adjustment step with the help of the difference as evaluated between the first estimate and the second estimate providing this difference is negative, with the threshold value otherwise remaining unchanged; and
  when the fuel flow rate threshold value under consideration is for use during a stage in which the aircraft is decelerating, this threshold value is adjusted during the adjustment step with the help of the difference as evaluated between the first estimate and the second estimate providing this difference is positive, with the threshold value otherwise remaining unchanged.

This implementation serves to protect the turbine engine against a risk of surging or of burning out or underspeeding.

In yet another implementation, the acceleration and deceleration stops are adjusted with the help of the difference between the first and second estimates, regardless of whether this difference is positive or negative.

This makes it possible not only to improve the performance of the turbine engine, but also to ensure that the accepted acceleration and deceleration margins are not overestimated for a risk of a compressor of the turbine engine surging or for a risk of the engine burning out.

In another aspect, the invention also provides the use of a fuel flow rate threshold value in an open loop for regulating a turbine engine of an aircraft during a transient stage of operation of the aircraft, this threshold value being adjusted with the help of an adjustment method of the invention.

In yet another aspect, the invention also provides a turbine engine for propelling an aircraft and comprising:
  a fuel metering device suitable for delivering an estimate of a flow rate of fuel injected into a combustion chamber of the turbine engine;
  an estimator device having a flow meter for estimating the injected fuel flow rate, said estimator device being suitable for delivering an estimate that is more accurate than the metering device for the rate at which fuel is being injected into the combustion chamber of the turbine engine, over at least one range of values of fuel flow rate; and
  a device for adjusting a fuel flow rate threshold value of the invention and suitable for using estimates delivered by the metering device and by the estimator device.

The method of use and the turbine engine of the invention have the same advantages as the above-specified adjustment method and device.

In a particular implementation, the various steps of the adjustment method are determined by computer program instructions.

Consequently, the invention also provides a computer program on a data medium, the program being suitable for being performed in an adjustment device, in a turbine engine, or more generally in a computer, the program including instructions adapted to performing steps of an adjustment method as described above.

The program may use any programming language, and be in the form of source code, object code, or code intermediate between source code and object code, such as in a partially compiled form, or in any other desirable form.

The invention also provides a computer readable data medium including instructions of a computer program as specified above.

The data medium may be any entity or device capable of storing the program. For example, the medium may comprise storage means, such as a read only memory (ROM), e.g. a compact disk (CD) ROM or a microelectronic circuit ROM, or indeed magnetic recording means, e.g. a floppy disk or a hard disk.

Furthermore, the data medium may be a transmissible medium such as an electrical or optical signal, suitable for being conveyed via an electrical or optical cable, by radio, or by other means. The program of the invention may in particular be downloaded from an Internet type network.

Alternatively, the data medium may be an integrated circuit in which the program is incorporated, the circuit being adapted to execute or to be used in the execution of the method in question.

In other embodiments or implementations, it is also possible to envisage that the adjustment method, the use of the method, the adjustment device, and the turbine engine of the invention may present in combination all or some of the above-specified characteristics.

BRIEF DESCRIPTION OF THE DRAWINGS

Other characteristics and advantages of the present invention appear from the following description made with reference to the accompanying drawings, which show an implementation having no limiting character. In the figures.

DETAILED DESCRIPTION OF THE INVENTION

Figure 1:
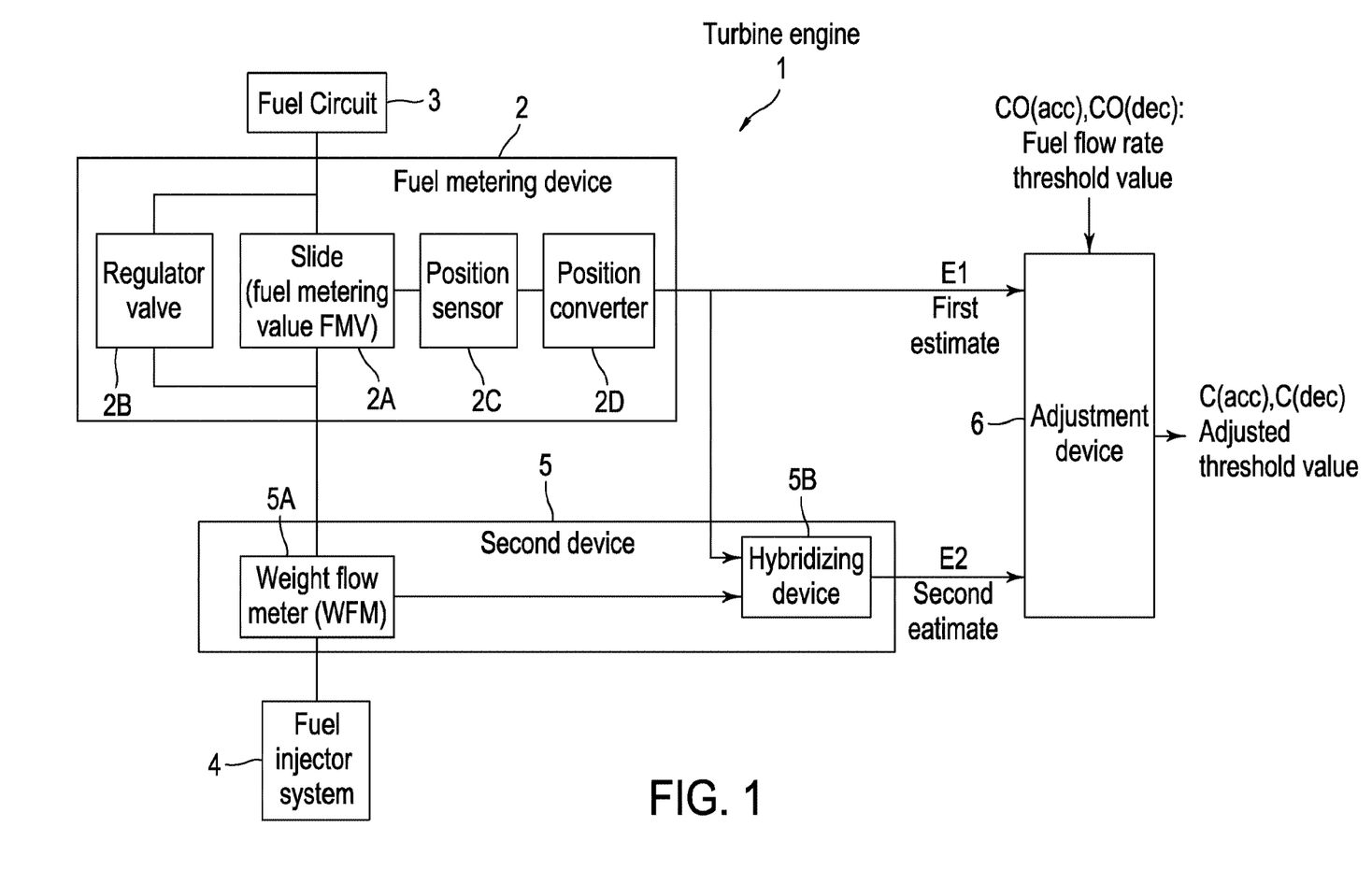
FIG. 1 is a block diagram of a turbine engine in accordance with the invention, in a particular embodiment.

FIG. 1 is a block diagram of a turbine engine 1 in accordance with the invention, in a particular embodiment.

In this embodiment, the turbine engine 1 is a turbojet for propelling an airplane. Nevertheless, the invention applies to other turbine engines, such as for example a turboprop, and also to other types of aircraft.

In accordance with the invention, the turbojet 1 has a fuel metering device 2 suitable for adjusting the quantity of fuel coming from the fuel circuit 3 of the airplane and delivered by the fuel injector system 4 into the combustion chamber of the turbojet.

As mentioned above, the fuel metering device 2 has a slide 2A (or fuel metering valve FMV) of position that varies as a function of the rate at which fuel is to be injected into the combustion chamber.

By moving, the slide obstructs a fuel flow section, referenced S, also referred to as the flow area of the metering device. It should be observed that the relationship between the area S and the position of the slide is itself known and is not described in greater detail herein.

The area S is proportional to the volume flow rate Qv of fuel injected into the combustion chamber, i.e.:

$$Qv = KS\sqrt{\Delta P}$$

where K is a constant and $\Delta P$ is the pressure difference through the metering device 2 that exists across the slide 2A. This pressure difference is kept constant by a regulator valve 2B of known type.

The volume flow rate Qv can be obtained by dividing a mass flow rate Qm by the density $\rho$ of the fuel flowing through the metering device. It is assumed herein that the density $\rho$ is constant. It is predetermined for a reference fuel and for a reference temperature.

The mass flow rate Qm is transmitted to the metering device 2 by an electronic regulator module ECU of the airplane FADEC in the form of a setpoint signal that is applied via a servo-control loop (not shown).

In the presently-described example, the fuel metering device 2 also has a position sensor 2C suitable for measuring the position of the slide 2A at various instants t=nTe, where n is a positive integer and Te is the sampling period of the electronic equipment of the turbojet 1. By way of example, the position sensor 2C is a linear variable differential transformer (LVDT) known to the person skilled in the art.

The measurement delivered by the position sensor 2C at instant t is transformed by a converter 2D, likewise of known type, into an estimate $E1(t)$ for the mass flow rate at which fuel is being injected into the combustion chamber of the turbojet 1. The estimate E1 is an estimate delivered by the metering device in the meaning of the invention.

In accordance with the invention, the turbojet 1 also has a second device 5 for estimating the flow rate of fuel injected into the combustion chamber and suitable for delivering an estimate of the injected fuel flow rate that is more accurate than the estimate E1 delivered by the metering device 2 over at least one range of fuel flow rate values.

In the presently-described embodiment, this second device 5 incorporates a weight flow meter (WFM) 5A such as a torque meter or a volume flow meter, together with a device 5B referred to as a "hybridizing" device 5B.

The hybridizing device 5B is suitable for delivering a second estimate $E2(t)$ for the flow rate of fuel injection at instant t into the combustion chamber of the turbojet 1 on the basis of the estimate $E1(t)$ and of a flow rate measurement performed by the WFM 5A. The combination of the estimate $E1(t)$ and of the measurement performed by the WMF serves advantageously to improve the accuracy with which fuel is metered and to know more accurately the rate at which fuel is being injected into the combustion chamber of the turbojet 1, over at least one range of fuel flow values (e.g. values greater than a threshold that is predetermined in particular as a function of the accuracy of the WMF).

In the presently-envisaged embodiment, the hybridizing device 5B is a device for preparing a setpoint signal identical to that described in Document FR 2 958 976: the second estimate $E2(t)$ used in accordance with the invention corresponds to the setpoint signal prepared using the mechanism described in Document FR 2 958 976, on the basis of the signal delivered by the WMF 5A and the signal evaluated from the measured position of the slide 2A of the metering device 2 (which signal corresponds in this example to the estimate $E1(t)$ delivered by the metering device 2). This setpoint signal advantageously provides a better estimate of the flow rate at which fuel is actually being injected into the combustion chamber of the turbojet 1 for a large range of fuel flow rate values. It makes it possible to take advantage both of the accuracy of the estimate of the fuel flow rate in absolute value as provided by the WFM 5A, and of the accuracy of the estimate in relative value (i.e. dynamic value) as provided by the metering device 2.

Figure 2:
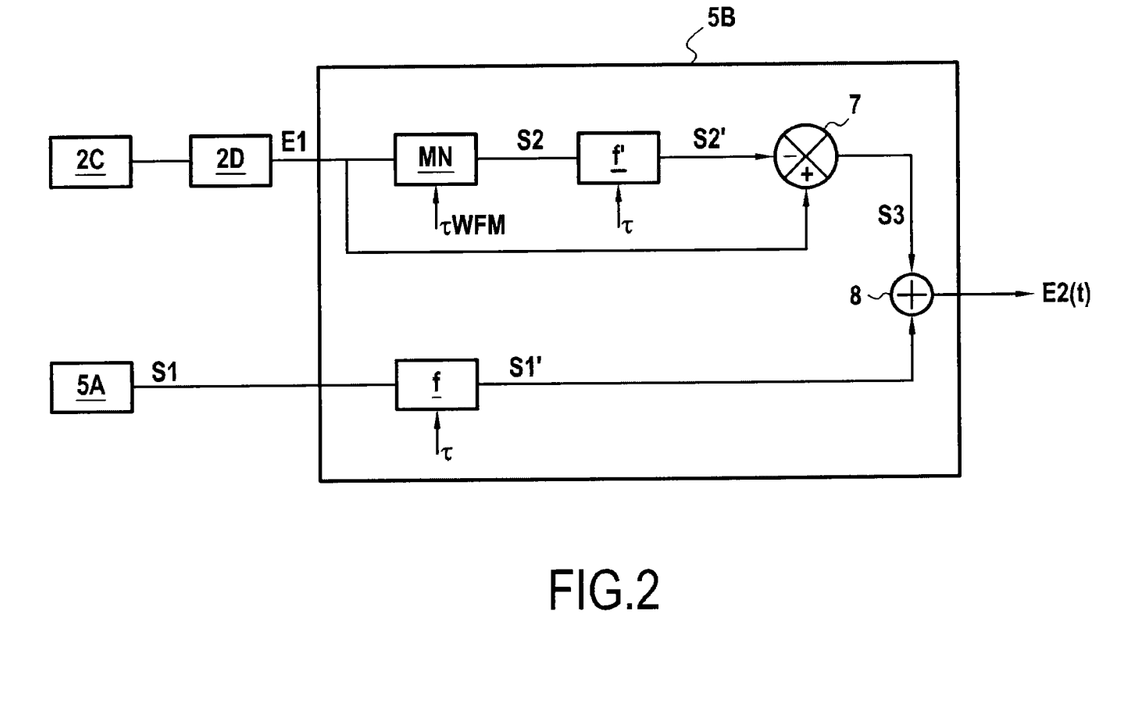
FIG. 2 shows a prior art device for estimating a flow rate of fuel injected into a combustion chamber of the turbojet and suitable for providing an estimate that is more accurate than the estimate provided by an fuel metering device, at least over a range of fuel flow rate values.

FIG. 2 briefly summarizes the operation of the hybridizing device 5B in a simplified variant embodiment.

As mentioned above, in order to deliver the fuel flow rate estimate $E2(t)$, the device 5B makes use firstly of a measurement signal $S1(t)$ relating to the rate at which fuel is injected into the combustion chamber and as delivered by the WFM 5A, and secondly of the estimate E1(t) as delivered by the converter 2D of the metering device 2 on the basis of the position of the slide 2A as measured by the position sensor 2C.

The signal S1(t) delivered by the WFM 5A is conventionally a squarewave signal. In order to enable it to be used, it is filtered by a lowpass digital filter f adapted to eliminate the squarewaves (in other words in order to smooth the signal S1). The time constant $\tau$ of the filter f is selected to be sufficiently high for this purpose. It is determined experimentally: the smallest time constant that enables a smooth signal to be obtained after filtering should be selected (preferably a constant of less than 1000 seconds (s)).

The signal obtained at the output from the filter f is written S1'(t).

In parallel with the processing applied to the signal S1(t), the signal E1(t) is delivered as input to a digital modeling module MN. The module MN is adapted to model the fuel flow rate as theoretically measured by the WFM 5A when a flow rate of fuel characterized by the signal E1 is passing therethrough. The signal modelled by the module MN and representative of the fuel flow rate measured by the WFM 5A is written S2.

The module MN is based on a digital model of the mechanical component of the WFM 5A, and in particular it takes account of its time constant $\tau$WFM. In this example, the time constant $\tau$WFM is assumed to be constant and equal to the time constant specified by the manufacturer of the WFM. It should be observed that such a digital model is itself known and is not described in greater detail herein.

Since the module MN is modeling the WFM 5A, it follows that the modelled signal S2 is also a squarewave signal in similar manner to the signal S1.

It is therefore delivered to a lowpass digital filter f' similar to the digital filter f (and in particular having the same time constant $\tau$) in order to be smoothed. In the presently-described example, the filters f and f' are identical.

The smoothed signal S2'(t) obtained at the output from the filter f' is then delivered to a subtractor element 7 arranged to subtract the signal S2'(t) from the signal E1(t).

The signal S3(t) resulting from this subtraction is then added with the help of an adder element 8 to the signal S1'(t) from the filter f in order to form the fuel flow rate estimate E2(t).

It should be observed that other variant embodiments that are more elaborate and that are described in Document FR 2 958 976 may be considered for providing the estimate E2 on the basis of the signal from the WFM 5A and of the estimate E1(t).

The estimate E2(t) delivered by the hybridizing device 5B is thus more accurate than the estimate E1(t) delivered by the metering device 2, for a wide range of fuel flow rate values. The accuracy of the estimate delivered by the metering device 2 is written $\delta 1$, and the accuracy of the estimate delivered by the device 5B is written $\delta 2$.

The accuracies $\delta 1$ and $\delta 2$ may be estimated on the basis of information provided by the respective manufacturers of the metering device 2 and of the device 5B, e.g. in the form of charts. In known manner, these accuracies may depend in particular on the engine speed N2 of the turbojet 1 for the accuracy $\delta 1$ and on the fuel flow rate under consideration for the accuracy $\delta 2$.

In a variant, it is possible to use other devices for estimating the rate at which fuel is being injected into the combustion chamber and suitable for delivering an estimate E2(t) that is more accurate than the estimate delivered by the metering device 2 over at least one range of fuel flow rate values, such as for example the device for determining a measurement of mass flow rate as described in Document EP 1 510 795.

In accordance with the invention, the turbojet 1 also includes a device 6 in accordance with the invention for adjusting a fuel flow rate threshold value C0, suitable for using the estimate E1(t) and E2(t) as delivered respectively by the metering device 2 and by the estimator device 5 for preparing an adjusted threshold value C.

In the presently-described embodiment, the adjustment device 6 is a digital module incorporated in the ECU regulator module of the airplane FADEC. More precisely, the adjustment device 6 comprises a computer program in accordance with the invention having instructions adapted to performing steps of an adjustment method of the invention, which instructions are stored in a ROM of the ECU of the FADEC.

The estimates E1(t) and E2(t) are transmitted to the adjustment device 6 via means for providing communication between the equipment of the turbojet 1 and the FADEC, which means are themselves known.

Figure 3:
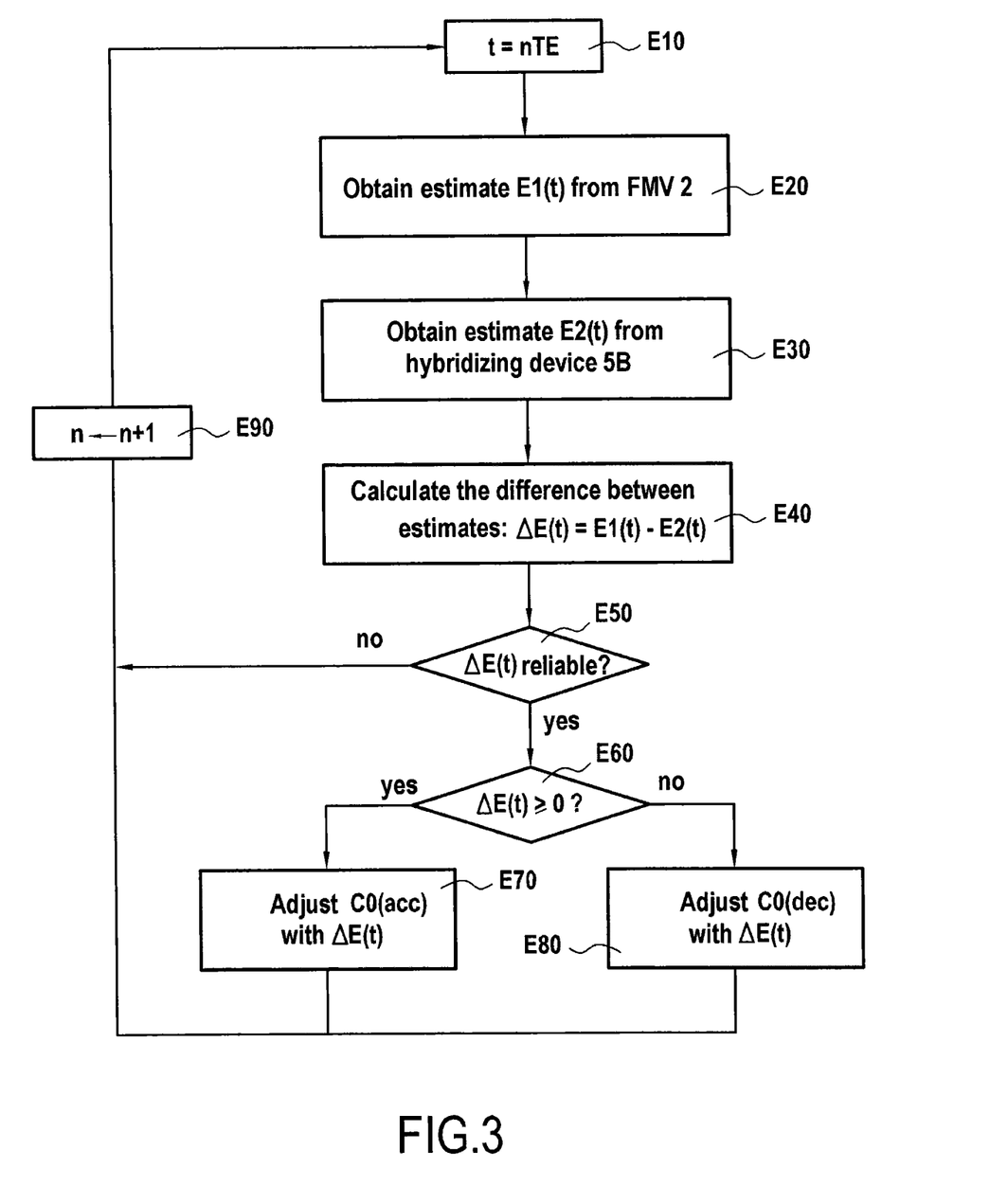
FIG. 3 shows the main steps of an adjustment method in accordance with the invention, in a particular implementation.

There follows a description with reference to FIG. 3 of the main steps of an adjustment method in accordance with the invention as performed by the adjustment device 6 in order to adjust a fuel flow rate threshold value C0 in a particular implementation of the invention.

The threshold value adjusted in accordance with the invention in this example is either an acceleration stop written C0(acc) for use in regulating the turbojet during a stage in which the airplane is accelerating, or else a deceleration stop written C0(dec) for use in regulating the turbojet during a stage in which the airplane is decelerating.

In the presently-described example, the acceleration and deceleration stops C0(acc) and C0(dec) are determined on the basis of limits relating to the ratio C0/P of the rate at which fuel is injected into the combustion chamber divided by the static pressure P measured at the outlet from the combustion chamber. In known manner, these limits are set by the sector in charge of the operability of the turbojet in order to avoid surging during acceleration or extinction of the turbojet 1 during deceleration, and taking account of equipment wear in the turbojet 1, of inaccuracies in the measuring equipment, of dispersions between different turbojets, etc. These limits depend in particular on the speed of the high pressure compressor of the turbojet 1, and on the total inlet pressure to the fan of the turbojet 1.

In the presently-described implementation, the adjustment is performed at different instants t=nTe (step E10) where n is a positive integer, and Te is the sampling period of the adjustment device 6 (which is assumed in this description to be identical to the sampling period of the metering device 2 and of the device 5), so as to optimize the accuracy of the acceleration and deceleration stops.

In a variant, this adjustment may be performed at predetermined instants, e.g. at the beginning of a stage of acceleration and/or at the beginning of a stage of deceleration, or periodically at instants that are multiples of the sampling period, in order to limit the number of adjustment operations that are performed. The adjustment frequency selected is the result of a compromise between complexity and performance in regulating the turbojet.

In accordance with the invention, the adjustment device 6 obtains a first estimate E1(t) for the flow rate of fuel being injected into the combustion chamber of the turbojet 1 at instant t (step E20). This first estimate is delivered by the converter 2D of the metering device 2 on the basis of the measured position of the slide 2A of the metering device 2 as measured by the position sensor 2C, as described above.

This first estimate E1(t) is delivered to the hybridizing device 5B. The hybridizing device 5B combines the estimate E1(t) with a measurement of the fuel flow rate as made by the WFM 5A at instant t, as described above with reference to FIG. 2, and from this combination it derives a second estimate E2(t) for the rate at which fuel is being injected into the combustion chamber of the turbojet 1 (step E30).

The adjustment device 6 then evaluates the difference ΔE(t) between the estimates E1(t) and E2(t) as obtained in this way (step E40). More precisely, in this example:

$$\Delta E(t)=E1(t)-E2(t)$$

In the presently-described implementation, before adjusting the acceleration or deceleration stops with the help of the difference ΔE(t), the adjustment device 6 verifies the reliability of this difference ΔE(t) compared with the accuracy δ1 of the metering device 2 (step E50).

For this purpose, it compares the difference ΔE(t) with a threshold defined on the basis of the accuracy δ1 of the metering device 2, or more precisely in this example, and in equivalent manner, on the basis of the inaccuracy level p1 of the metering device 1.

Thus, during this comparison, the adjustment device 6 verifies whether:

$$\frac{|\Delta E(t)|}{E1(t)} \times 100 < p1$$

where p1 is expressed as a percentage and designates the inaccuracy level of the estimate E1(t) delivered by the metering device 2 (it should be observed that if δ1 is also expressed as a percentage, then p1 and δ1 are related by the equation p1=100−δ1). The level p1 may be predetermined in manner known to the person skilled in the art as a function of the engine speed of the turbojet 1 and of specifications provided by the manufacturer of the metering device 2.

The adjustment device 6 thus ensures that the correction provided to the threshold value does not exceed the maximum inaccuracy p1 of the metering device 2. In other words, this comparison enables the adjustment device 6 to verify that the accuracy of the estimate E2(t) is indeed better than the accuracy of the estimate E1(t) for the flow rate under consideration.

If the adjustment device 6 determines that the difference ΔE(t) is not reliable (in other words that it does not satisfy the above inequality), then it does not adjust the acceleration and deceleration stops.

It should be observed that other tests may be performed in order to detect whether it is appropriate to adjust the acceleration stop on the basis of the difference ΔE(t). Thus, by way of example, it is possible to compare the estimate E1(t) or E2(t) with the range of values in which the estimate E2(t) is known to be more accurate than the estimate E1(t), and to deactivate adjusting the acceleration and deceleration stops if the fuel flow rate estimated by E1(t) or E2(t) does not lie within this range.

If the adjustment device 6 determines that the difference ΔE(t) is reliable, then it determines the sign of the difference ΔE(t) (step E60).

In the presently-described implementation, if it is determined that the difference ΔE(t) is positive or zero (response "yes" to the test of step E60), then the adjustment device 6 adjusts the acceleration stop C0(acc) on the basis of this difference (step E70) as described below with reference to FIG. 4.

On the contrary, if it is determined that the difference ΔE(t) is negative (response "no" to the test of step E60), then the adjustment device 6 adjusts the deceleration stop C0(dec) on the basis of the difference ΔE(t) as described below with reference to FIG. 5 (step E80).

The values as adjusted at the instant t, written C(acc) or C(dec) advantageously take account of the lack of accuracy of the metering device 2 at the instant t.

Steps E10 to E80 are reiterated for the next sampling instant (n+1)Te (step E90), etc.

The threshold values C(acc) and C(dec) as adjusted in this way may advantageously be used in an open loop for regulating the turbojet 1 as performed during a stage in which the airplane is operating in transient manner (e.g. accelerating or decelerating), and during which the fuel flow rate estimate E1(t) delivered by the metering device 2 is compared with the values C(acc) and C(dec) in order to determine the acceleration or deceleration margin that is available for the turbojet. This thus improves the performance of the turbojet 1.

Figure 4:
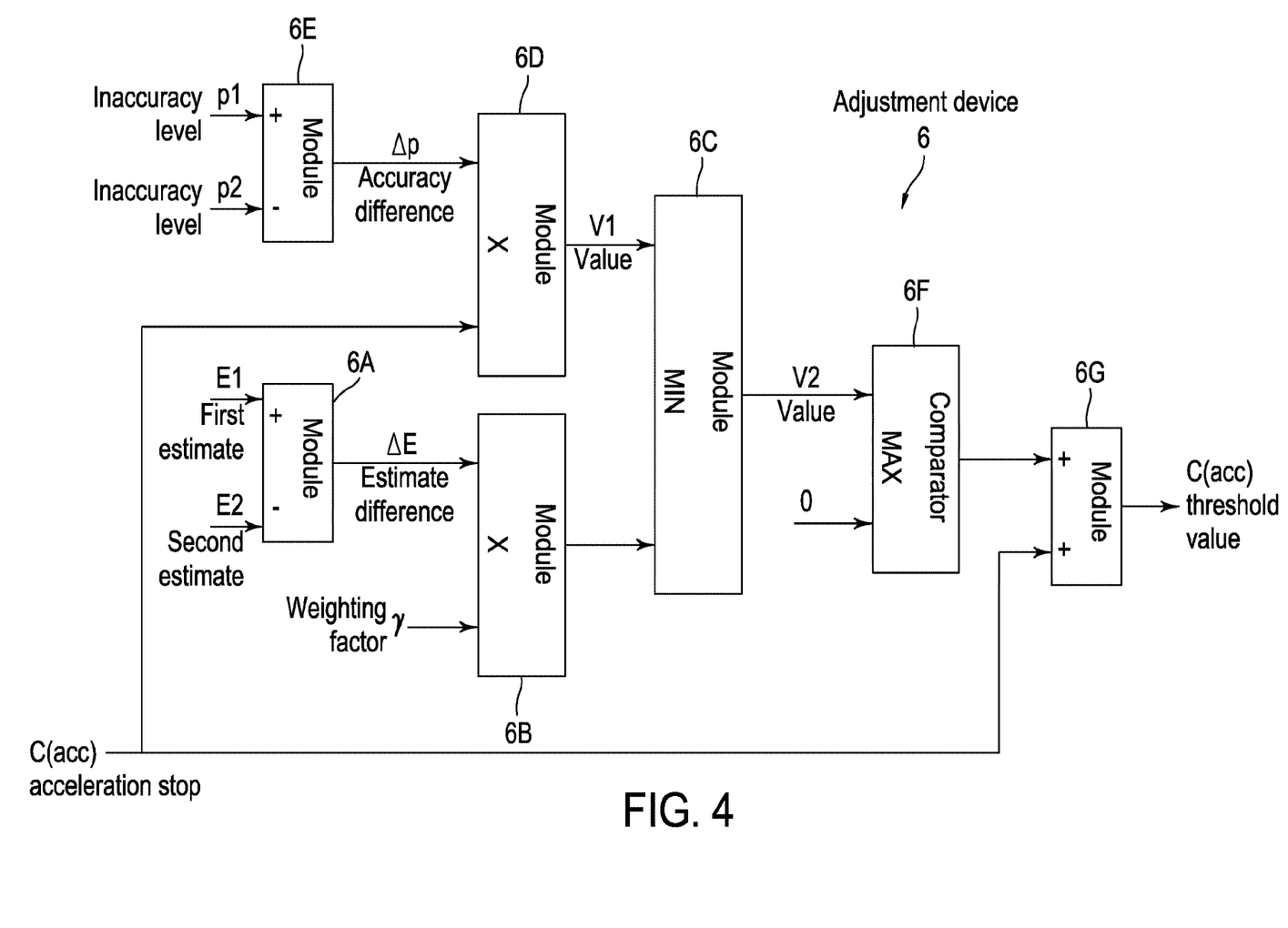
FIGS. 4 and 5 show respectively how an acceleration stop and a deceleration stop are adjusted in accordance with a preferred variant of the implementation of the invention shown in FIG. 3.

There follows a more detailed description with reference to FIG. 4 of the way in which the acceleration stop C0(acc) is adjusted in a preferred implementation.

As described above, the adjustment device 6 evaluates at each instant the difference ΔE(t) between the estimates E1(t) and E2(t) by using a module 6A.

It is assumed herein that the difference ΔE(t) is considered as being small at the end of the above-described comparison step E50 (otherwise this value is forced to zero in order to avoid erroneous adjustment of the acceleration stop C0(acc)).

In the presently-described variant, the difference ΔE(t) is weighted by a multiplicative factor written γ, that is applied by a weighting module 6B. The weighting factor γ is a positive number that is less than or equal to 1. It serves to determine the adjustment that is applied to the threshold value C0(acc).

The weighted difference γ×ΔE(t) is then compared in a module 6C with a value V1. The module 6C selects the minimum value, written V2, between the weighted difference γ×ΔE(t) and the value V1.

The value V1 corresponds to an expected accuracy difference for the estimates E1(t) and E2(t). It is calculated by a module 6D as being the product of the acceleration stop C0(acc) that is not adjusted at the instant t multiplied by the difference written Δp between the accuracies of the estimates delivered by the metering device 2 and by the hybridizing device 5B.

The accuracy difference Δp is evaluated by a module 6E. In this example it is taken as being equal to p1-p2, where:
  as mentioned above, p1 designates the inaccuracy level, expressed as a percentage of the estimate, of the estimate E1(t) delivered by the metering device 2 (p1=100−δ1, where δ1 designates the accuracy of the estimate E1(t)): p1 is calculated in a manner known to the person skilled in the art as a function of the engine speed of the turbojet 1 and of specifications provided by the manufacturer of the metering device 2; and
  in similar manner, p2 designates the inaccuracy level, expressed as a percentage, of the estimate E2(t) delivered by the hybridizing device 5B ((p2=100−δ2, where δ2 designates the accuracy of the estimate E2(t) expressed as a percentage). This inaccuracy level p2 depends, in this example, on the fuel flow rate threshold value C0(acc) and on specifications provided by the manufacturer of the device 5B.

In other words, given the definition taken into consideration herein for p1 and p2, for fuel flow value ranges within which the estimate E1($t$) is more accurate than the estimate E2($t$), $\Delta p = p1 - p2$ is negative.

Conversely, for fuel flow value ranges in which the estimate E2($t$) delivered by the hybridizing device 5B is more accurate than the estimate E1($t$) delivered by the metering device 2, $\Delta p = p1 - p2$ is positive.

By taking the minimum value between V1 and $\gamma \times \Delta E(t)$, it is ensured while adjusting the threshold value C0(acc) that the difference existing between the accuracies of the metering device 2 and of the hybridizing device 5B is never exceeded: this serves to guarantee the reliability of the value used for adjusting the threshold value C0(acc).

Naturally, equivalent reasoning can be applied to the accuracy difference $\Delta p = \delta 2 - \delta 1$.

The value V2 delivered by the module 6C is then compared by a comparator 6F with zero: the module 6F selects the maximum value between V2 and zero.

Thereafter, a module 6G adjusts the value C0(acc) by using the value selected by the module 6F. In other words, if the value V2 is greater than or equal to zero, it is used for adjusting the threshold value C0(acc).

More precisely in this example, a module 6G adjusts the threshold value C0(acc) so that it becomes a threshold value C(acc) in application of the following equation:

$$C(acc) = C0(acc) + V2$$

Figure 5:
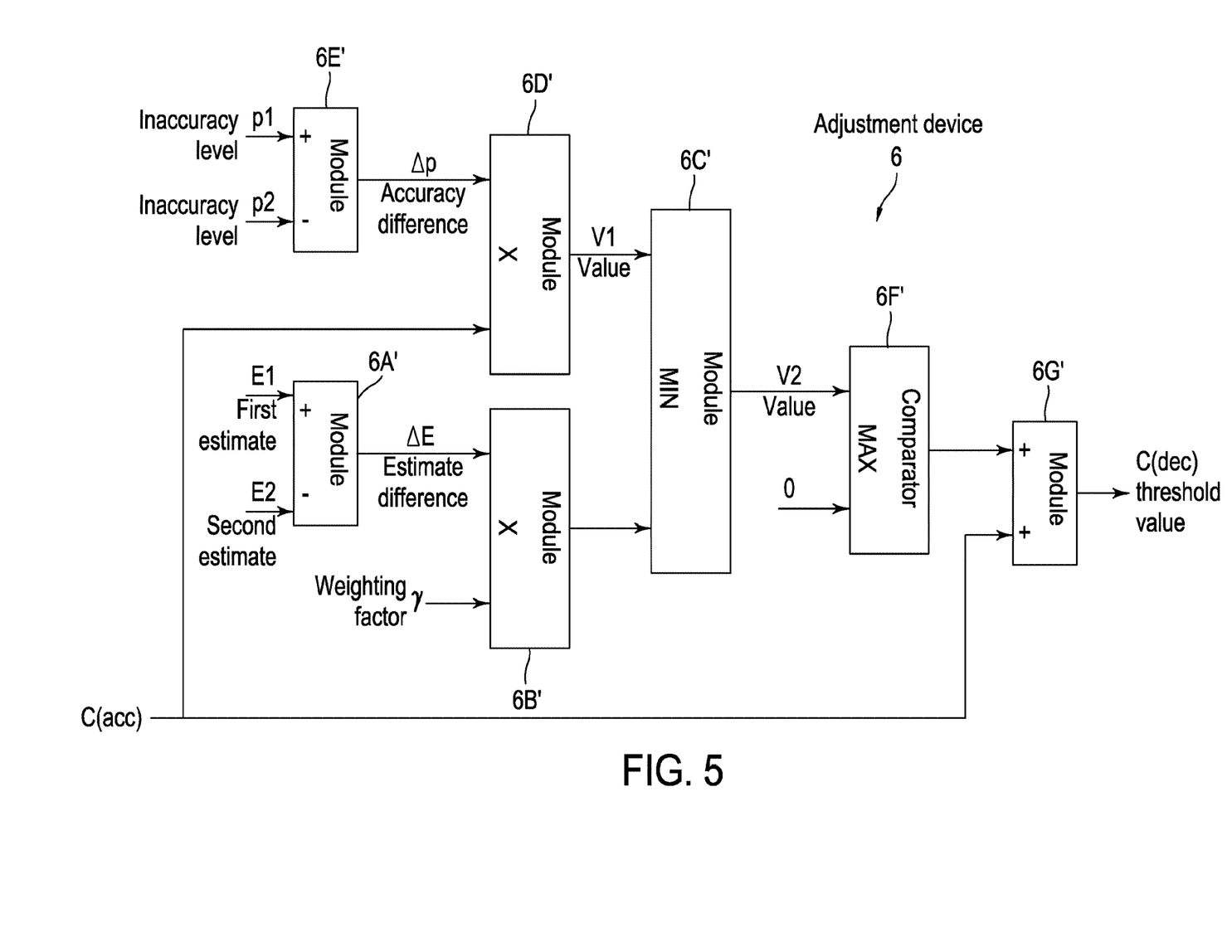

In the presently-described implementation, if V2 is less than 0, then the deceleration stop C0(dec) is adjusted, as shown in FIG. 5.

The modules 6A', 6B', 6C', 6D', 6E', and 6G' shown in FIG. 5 are identical or similar to the modules 6A, 6B, 6C, 6D, 6E, and 6G in FIG. 4, apart from the fact that they operate on the deceleration stop C0(dec) instead of operating on the acceleration stop C0(acc).

Furthermore, the comparator 6F' compares the value V2 with 0, but unlike the comparator 6F in FIG. 4, it selects the minimum value between V2 and 0.

The module 6G' then adjusts the threshold value C0(dec) using the value selected by the module 6F'. In other words, if the value V2 is less than 0, it is used for adjusting the threshold value C0(dec) into a threshold value C(dec) in compliance with the following equation:

$$C(dec) = C0(dec) + V2$$

Thus, in the presently-described implementation, if $\Delta E(t)$ is positive it is the acceleration stop that is adjusted and if $\Delta E(t)$ is negative, it is the deceleration stop that is adjusted.

Figure 6:
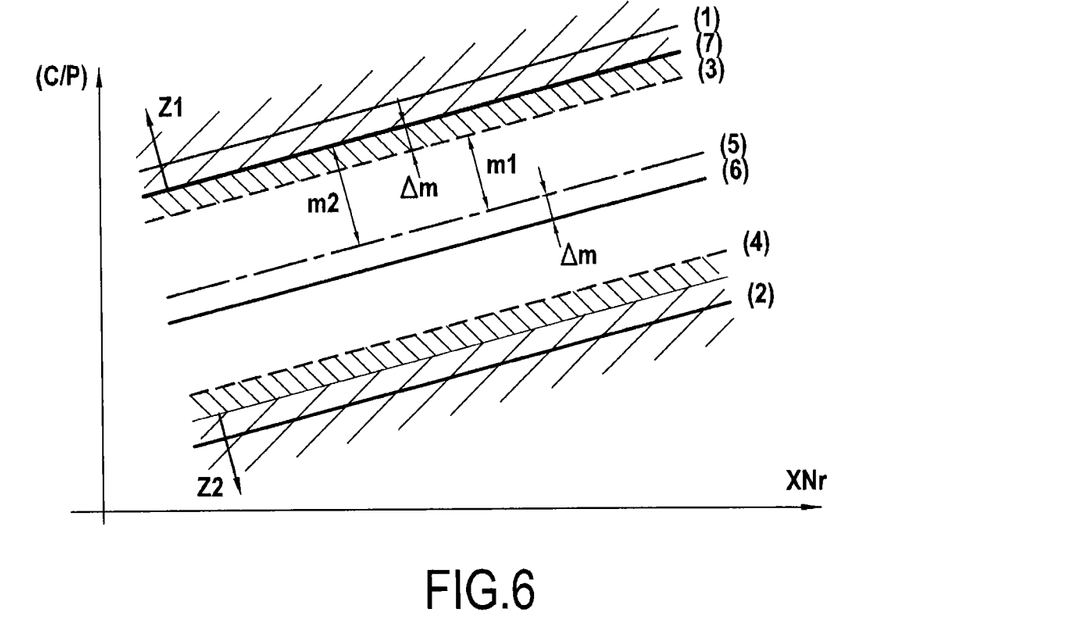
FIGS. 6 and 7 are graphs showing examples of threshold values adjusted in accordance with the invention, together with the resulting improvement in acceleration or deceleration margin.
Figure 7:
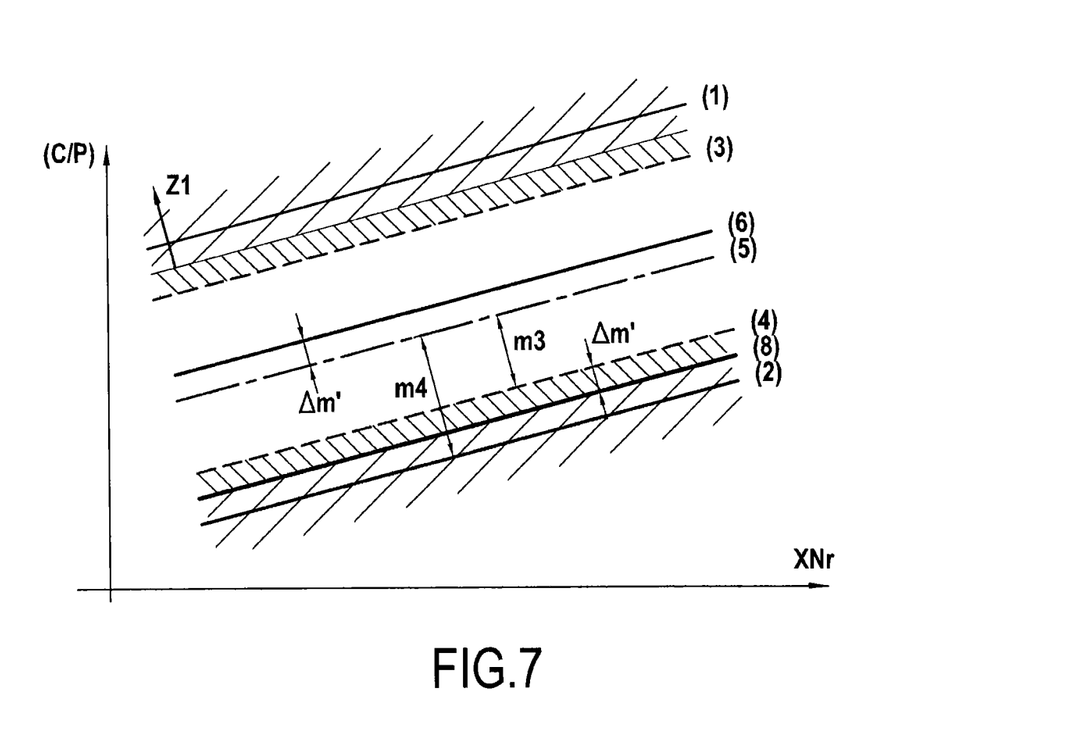

FIGS. 6 and 7 show respective examples of adjustments to the threshold values C0(acc) and C0(dec) as performed in accordance with the invention.

FIG. 6 shows variations in the ratio (C/P) of the rate at which fuel is injected into the combustion chamber of the turbojet divided by the outlet pressure from the combustion chamber, as a function of the derated-load speed XNr of the turbojet 1.

In this figure:
curve (1) represents the surge line of the turbojet and Z1 the zone in which there is a risk of surging;
curve (2) represents the burnout line of the turbojet and Z2 the zone in which there is a risk of the turbojet burning out; and
the curves (3) and (4) show respectively the ratio of the non-adjusted acceleration and deceleration stops C0(acc) and C0(dec) divided by the pressure P at the outlet from the combustion chamber, i.e. the stops as evaluated by the operability sector of the turbojet 1 as a function of its characteristics.

The curve (5) represents the ratio (C/P) evaluated from the fuel flow rate estimate E1($t$) delivered by the metering device 2 of the turbojet 1.

The "virtual" acceleration margin availability to the turbojet during a stage of the airplane accelerating and taking account of the estimate (5) is thus represented by m1: it corresponds to the difference that exists between the curve (3) representing the ratio of the acceleration stop C0(acc) divided by the pressure P, and the curve (5).

It is now assumed that the estimate E1($t$) for the fuel flow rate as delivered by the metering device 2 is overestimated, and that a more accurate estimate of the rate at which fuel is being injected into the combustion chamber, e.g. the estimate E2($t$) as delivered by the hybridizing device 5B would lead to the curve (6) being obtained. In other words, the "real" acceleration margin available to the turbojet during a stage in which the airplane is accelerating is m1+$\Delta$m, where $\Delta$m is positive (this real acceleration margin corresponding to the difference between the curve (6) and the curve (3)).

In accordance with the invention, the acceleration stop C0(acc) is adjusted to take account of the accuracy difference between the estimates E1($t$) and E2($t$). The curve (7) represents the ratio of the acceleration stop C(acc) adjusted in accordance with the invention divided by the outlet pressure P from the combustion chamber.

The extra acceleration margin made available for the turbojet 1 by taking account of the acceleration stop C(acc) as adjusted in accordance with the invention is now m2=m1+$\Delta$m. This margin has thus been increased, and compensates for the overestimate of the fuel flow rate delivered by the metering device 2.

In similar manner, FIG. 7 shows variations in the ratio (C/P) of the rate at which fuel is injected into the combustion chamber of the turbojet divided by the outlet pressure P from the combustion chamber, as a function of the derated-load speed XNr of the turbojet.

In this figure:
the curve (1) represents the surging line of the turbojet, and Z1 represents the zone in which there is a risk of surging;
the curve (2) represents the burnout line of the turbojet, and Z2 represents the zone in which there is a risk of the turbojet burning out; and
the curves (3) and (4) represent respectively the ratio of the non-adjusted acceleration and deceleration stops C0(acc) and C0(dec) divided by the outlet pressure P from the combustion chamber, i.e. the stops as evaluated by the operability sector of the turbojet 1 as a function of its characteristics.

The curve (5) represents the ratio (C/P) evaluated from the fuel flow rate estimate E1($t$) delivered by the metering device 2 of the turbojet 1.

The "virtual" deceleration margin available to the turbojet during a stage in which the airplane is decelerating, and when taking account of the estimate (T) is then represented by m3: it corresponds to the difference between the curve (4) representing the ratio of the acceleration stop C0(dec) divided by pressure, and the curve (5).

It is now assumed that the estimate E1($t$) of fuel flow rate as delivered by the metering device 2 is underestimated, and that a more accurate estimate of the rate at which fuel is being injected into the combustion chamber, e.g. the estimate E2(*t*) as delivered by the hybridizing device 5B, would lead to obtaining curve (6). In other words the "real" deceleration margin available to the turbojet during a stage in which the airplane is decelerating is m3+Δm', where Δm' is positive (this real deceleration margin corresponding to the difference between the curve (6) and the curve (4)).

In accordance with the invention, the deceleration stop C0(dec) is adjusted to take account of the accuracy difference between the estimates E1(*t*) and E2(*t*). The curve (8) represents the ratio of the deceleration stop C(dec) adjusted in accordance with the invention divided by the outlet pressure from the combustion chamber. The new deceleration margin that is available to the turbojet when taking account of the deceleration stop as adjusted in accordance with the invention is now m4=m3+Δm'. It has therefore been increased, and compensates for the underestimate of the fuel flow rate as delivered by the metering device 2.

The invention thus leads to an improvement in the acceleration and deceleration margins.

It should be observed that in the presently-described implementation, if the flow rate of fuel injected into the combustion chamber is overestimated by the metering device 2, then it is the acceleration margin that is adjusted, while if the flow rate of fuel injected into the combustion chamber has been underestimated by the metering device 2, then it is the deceleration margin that is adjusted. This adjustment strategy enables the performance of the turbojet 1 to be improved.

Nevertheless, other adjustment strategies could be envisaged, depending on the objectives that it is desired to achieve.

Thus, in another implementation, the acceleration margin is adjusted if the flow rate at which fuel is being injected into the combustion chamber has been underestimated by the metering device 2 (ΔE(t) negative), and the deceleration margin is adjusted if the flow rate at which fuel is being injected into the combustion chamber has been overestimated by the metering device 2 (ΔE(t) positive).

In yet another implementation, both stops C0(acc) and C0(dec) are adjusted with the help of the difference ΔE(t) independently of its sign, e.g. at each sampling instant nTe.

The invention claimed is:

1. A method for regulating a turbine engine propelling an aircraft, the method comprising:
    obtaining a first estimate of a flow rate of fuel injected into a combustion chamber of the turbine engine and as delivered by a fuel metering device of the turbine engine;
    obtaining a second estimate of the flow rate of the fuel injected into the combustion chamber of the turbine engine and as delivered by a second device of the turbine engine having a flow meter, wherein the second estimate of the flow rate of the fuel is more accurate than the first estimate of the flow rate of the fuel for at least one range of fuel flow rate values;
    adjusting a fuel flow rate threshold value by evaluating a difference between the first estimate of the flow rate of the fuel and the second estimate of the flow rate of the fuel, wherein the difference between the first estimate of the flow rate of the fuel and the second estimate of the flow rate of the fuel is obtained by subtracting the second estimate of the flow rate of the fuel from the first estimate of the flow rate of the fuel; and
    regulating the fuel delivery to the turbine engine based on the adjusted fuel flow rate threshold value.

2. The method according to claim 1, wherein the adjusting the fuel flow rate threshold value includes adding the difference evaluated between the first estimate of the flow rate of the fuel and the second estimate of the flow rate of the fuel to the fuel flow rate threshold value, as weighted by a predetermined weighting factor.

3. The method according to claim 2, further comprising:
    comparing the difference evaluated between the first estimate of the flow rate of the fuel and the second estimate of the flow rate of the fuel as weighted by the predetermined weighting factor with an expected accuracy difference evaluated between the first estimate of the flow rate of the fuel and the second estimate of the flow rate of the fuel.

4. The method according to claim 1, further comprising:
    comparing the difference evaluated between the first estimate of the flow rate of the fuel and the second estimate of the flow rate of the fuel with a threshold defined on the basis of an expected accuracy for the first estimate of the flow rate of the fuel delivered by the fuel metering device.

5. The method according to claim 1, wherein the fuel flow rate threshold value is a value for use during a stage of the aircraft accelerating.

6. The method according to claim 5, wherein during the adjusting the fuel flow rate threshold value, the fuel flow rate threshold value is adjusted only when the difference evaluated between the first estimate of the flow rate of the fuel and the second estimate of the flow rate of the fuel is positive.

7. The method according to claim 1, wherein the fuel flow rate threshold value is a value for use during a stage in which the aircraft is decelerating.

8. The method according to claim 7, wherein, during the adjusting of the fuel flow rate threshold value, the fuel flow rate threshold value is adjusted only when the difference evaluated between the first estimate of the flow rate of the fuel and the second estimate of the flow rate of the fuel is negative.

9. A non-transitory computer readable medium storing computer readable instructions thereon that when executed by a computer cause the computer to perform a method comprising:
    obtaining a first estimate of a flow rate of fuel injected into a combustion chamber of a turbine engine and as delivered by a fuel metering device of the turbine engine;
    obtaining a second estimate of the flow rate of the fuel injected into the combustion chamber of the turbine engine and as delivered by a second device of the turbine engine having a flow meter, wherein the second estimate of the flow rate of the fuel is more accurate than the first estimate of the flow rate of the fuel for at least one range of fuel flow rate values;
    adjusting a fuel flow rate threshold value to regulate the turbine engine by evaluating a difference between the first estimate of the flow rate of the fuel and the second estimate of the flow rate of the fuel; and
    regulating the fuel delivered to the turbine engine based on the adjusted fuel flow rate threshold value.

10. A device for regulating a turbine engine propelling an aircraft, the device comprising:
    circuitry configured to
        obtain a first estimate of a flow rate of fuel injected into a combustion chamber of the turbine engine and as delivered by a fuel metering device of the turbine engine,
        obtain a second estimate of the flow rate of the fuel injected into the combustion chamber of the turbine engine and as delivered by a second device of the turbine engine having a flow meter, the second estimate of the flow rate of the fuel is more accurate than the first estimate of the flow rate of the fuel for at least one range of fuel flow rate values, adjust a fuel flow rate threshold value by evaluating a difference between the first estimate of the flow rate of the fuel and the second estimate of the flow rate of the fuel, and regulate the fuel delivery to the turbine engine based on the adjusted fuel flow rate threshold value.

11. The turbine engine for propelling the aircraft, comprising:

the device of claim 10;

the fuel metering device configured to deliver the first estimate of the flow rate of the fuel injected into the combustion chamber of the turbine engine; and the second device including the flow meter for estimating the second estimate of the flow rate of the fuel injected into the combustion chamber of the turbine engine, the second device configured to deliver the second estimate of the flow rate of the fuel.

\* \* \* \* \*